United States Patent [19]

Schulz et al.

[11] Patent Number: 5,002,695
[45] Date of Patent: Mar. 26, 1991

[54] FOAM REGULATORS SUITABLE FOR USE IN DETERGENTS AND CLEANING PREPARATIONS

[75] Inventors: Paul Schulz, Wuppertal; Juergen Haerer; Claus-Peter Kurzendoerfer, both of Duesseldorf; Franz-Josef Carduck, Haan; Friedrich W. Diekoetter, Langenfeld; Ulrich Jahnke, Monheim; Edmund Schmadel, Leichlingen, all of Fed. Rep. of Germany

[73] Assignee: Henkel Kommanditgesellschaft auf Aktien, Duesseldorf, Fed. Rep. of Germany

[21] Appl. No.: 252,418

[22] Filed: Sep. 30, 1988

[30] Foreign Application Priority Data

Sep. 30, 1987 [DE] Fed. Rep. of Germany ....... 3732947

[51] Int. Cl.$^5$ .............................................. B01D 19/04
[52] U.S. Cl. .................................... 252/321; 252/358; 252/174.14; 252/174.15
[58] Field of Search ................... 252/321, 358, 174.13, 252/174.14, 174.15

[56] References Cited

U.S. PATENT DOCUMENTS

| | | | |
|---|---|---|---|
| 3,652,453 | 3/1972 | MacDonald | 252/358 |
| 3,677,963 | 7/1972 | Lichtman et al. | 252/358 |
| 3,951,853 | 4/1976 | Suwala | 252/321 |
| 4,032,473 | 6/1977 | Berg et al. | 252/358 |
| 4,192,761 | 3/1980 | Peltre | 252/321 |
| 4,225,456 | 9/1980 | Schmidt et al. | 252/321 |
| 4,265,779 | 5/1981 | Gandolfo et al. | 252/358 |
| 4,514,319 | 4/1985 | Kulkarni et al. | 252/321 |
| 4,599,189 | 7/1986 | Wuhrmann et al. | 252/174.15 |
| 4,801,401 | 1/1989 | Schulz et al. | 252/358 |

FOREIGN PATENT DOCUMENTS

| | | |
|---|---|---|
| 0000216 | 1/1979 | European Pat. Off. . |
| 0075437 | 3/1983 | European Pat. Off. . |
| 0087233 | 8/1983 | European Pat. Off. . |
| 0094250 | 11/1983 | European Pat. Off. . |
| 0056160 | 3/1985 | European Pat. Off. . |
| 2043087 | 3/1972 | Fed. Rep. of Germany . |

OTHER PUBLICATIONS

MacKenzie and Mitchell: Differential Thermal Analysis, A Review, vol. 87, pp. 420–432.

*Primary Examiner*—Richard D. Lovering
*Assistant Examiner*—Daniel S. Metzmaier
*Attorney, Agent, or Firm*—Ernest G. Szoke; Wayne C. Jaeschke; Real J. Grandmaison

[57] ABSTRACT

A foam regulator consisting essentially of a mixture, applied to a particulate support material, of (a) 5 to 60% of a paraffin wax, (b) 20 to 90% of a microcrystalline paraffin wax which shows defined melting behavior as a function of temperature and (c) 5% to 20% of a diamide derived from $C_2$–$C_7$ diamines and $C_{12}$–$C_{22}$ fatty acids which is present in the paraffin mixture in very finely divided form. The mixture is preferably prepared by reaction of the diamines with the fatty acids in a molten mixture of components (a) and (b) in the presence of an acidic catalyst.

11 Claims, No Drawings

FOAM REGULATORS SUITABLE FOR USE IN DETERGENTS AND CLEANING PREPARATIONS

BACKGROUND OF THE INVENTION

1. Field of the Invention

This invention relates to a foam regulator which, when used in detergent and cleaning preparations, is effective over a broad temperature range, i.e. suppressed troublesome foaming in the cold-wash range (20° to 30° C.), at medium washing temperatures (40° to 60° C.) and also in the boil-wash range. In addition, the foam regulator is stable in storage and in its effect in admixture with standard detergent ingredients and has no adverse effects either on the washed fabrics or on the environment.

2. Discussion of Related Art

Foam inhibitors based on paraffins and paraffin mixtures, including microcrystalline paraffins, suitable for use in detergents are known. To enhance their effect and, at the same time, to reduce the necessary in-use concentration, other known foam inhibitors, particularly polysiloxanes, polysiloxane/silica mixtures or bis-acylalkylenediamines derived from long-chain fatty acids (hereinafter referred to in short as bisamides), are often added to them. However, polysiloxanes are comparatively expensive and have the disadvantage that they hydrophobicize the fabrics or rather the surface of the treated items and that, in addition, they are largely resistant to biological degradation in the waste water. Accordingly, there is a further need to develop highly effective foam inhibitors which are free from silicon polymers.

The use of bisamides with paraffins as foam inhibitors for detergents is already known from German Patent Application, 20 43 087. However, the formulations mentioned therein do not have a uniform foam-inhibiting effect over a wide temperature range. Other preparations containing bisamides are known from European Patents 75 437 and 94 250. However, both contain silicones and cannot be considered for the reasons already mentioned. European Patent 87 233 describes a process for the production of a low-foaming detergent in which mixtures of an oily or wax-like substance and bisamides are applied to a powder-form substrate, more especially a spray-dried surfactant-containing detergent. The oily or wax-like substance may consist, for example, of petroleum jelly having a melting point of 20° to 120° C., and preferably 45° to 65° C. Mineral oil is used for this purpose in the examples. There is no further differentiation of the wax-like constituent. It is quite clear that this component serves primarily as a support or dispersant for the bisamide. Although satisfactory results are obtained in the Ross-Miles foam test where 2% by weight of a foam inhibitor mixture, based on the detergent, are used, these quantities appear far too large for practical purposes. In addition, it has been found that the blending technique used, i.e. spraying of the foam inhibitor onto the spray-dried surfactant-containing detergent, adversely affects the stability of the foam regulating component in storage, with the result that its activity decreases with increasing storage time.

Numerous other foam inhibitors containing bisamides as constituents are known. However, they are not specifically intended for use in detergents and cleaning preparations and, accordingly, do not show the desired temperature profile. In general, they contain silicones and/or emulsifiers and, hence, are attended by the described disadvantages. Examples of foam inhibitors such as these can be found in German Patents 21 41 905, 21 48 638, 24 04 210, 25 49 193, 29 44 604 and 30 08 952, and European Patent 56 160. Such foam inhibitors are used in the paper, sugar and textile industries and also for the defoaming of latices and drilling and cutting oil emulsions. These fields of application are not comparable with the special requirements of detergents and cleaning preparations.

DESCRIPTION OF THE INVENTION

Other than in the operating examples, or where otherwise indicated, all numbers expressing quantities of ingredients or reaction conditions used herein are to be understood as modified in all instances by the term "about".

The invention, which solves the problem stated above and avoids the described disadvantages, provides a free-flowing foam regulator suitable for use in detergent and cleaning preparations, which consists essentially of:

(I) a water-soluble, granular surfactant-free support material, and (II) an adsorbed foam inhibitor mixture which is free from siloxane polymers and emulsifying or dispersing surfactants and which consists essentially of a homogeneous mixture of the following consituents:

(a) 5 to 60% by weight of a paraffin wax or paraffin wax mixture, (b) 20 to 90% by weight of a microcrystalline paraffin wax, wherein the proportion of liquid constituents in the mixture of (a) and (b), as determined by differential thermal analysis (DTA), amounts to 0% at $-15°$ C., between 0 and 5% at 0° C., between 2 and 25% at 25° C., between 20 and 80% at 50° C., between 80 and 100% at 75° C. and 100% above 90° C., and (c) 5 to 20% by weight of a diamide derived from $C_2$–$C_7$ diamines and saturated $C_{12}$–$C_{22}$ fatty acids which is present in finely divided form and which has a particle size of less than 50 μm, at least 90% of the particles being smaller than 30 μm.

The support material (1) has a granular structure and consists essentially of water-soluble, surfactant-free compounds, primarily inorganic or organic salts suitable for use in detergent and cleaning preparations. Examples of these salts include water-soluble, neutral alkali metal salts showing a mildly acidic or mildly alkaline reaction, such as sodium sulfate, sodium bicarbonate, sodium borates, sodium hydrogen phosphate, sodium hydrogen pyrophosphate, and mixtures of the above-mentioned salts. The corresponding potassium salts are also suitable. Small amounts of alkaline reacting salt which do not significantly increase the alkalinity may also be used, including for example polyphosphates (sodium tripolyphosphate), sodium carbonate and sodium silicate (waterglass). Suitable organic salts include for example, the acetates, tartrates, succinates, carboxymethyl succinates and the salts of aminopolycarboxylic acids, such as NTA or EDTA, hydroxyalkanephosphonates and aminoalkanephosphonates, such as 1-hydroxyethane-1, 1-diphosphonate, ethylenediamine tetramethylenephosphonate and diethylenetriamine pentamethylenephosphonate. Polymers, such as cellulose ethers, and salts of polymeric or copolymeric carboxylic acids may also be used. Mixtures of inorganic and organic salts may often be used with advantage.

The pH value of the salts and salt mixtures in 1% aqueous solution should be below 10, preferably between 5 and 9 and more preferably between 6 and 8.5. More strongly alkaline supports lead to a gradual loss of activity.

The support material is preferably present in a form in which the particles have a loose porous structure. A structure such as this may be obtained by spray drying of a salt solution. Spray-dried support particles such as these generally have a particle size of 0.1 to 1.6 mm and preferably from 0.2 to 0.8 mm and contain less than 1% dust. The dust, like the coarse particles, is preferably separated off. The apparent density of suitable support particles is in the range from 200 to 700 g/l and preferably in the range from 300 to 600 g/l (grams per liter).

In addition to water-soluble salts, the support particles may also contain certain proportions of water-insoluble, but water-dispersible adsorbents, such as precipitated or pyrogenic silica or finely divided clays. However, the quantity in which they are present should be gauged in such a way that the disintegration of the support particles in cold or moderately warm water and the release of the foam inhibitor is not significantly impeded and, in the presence of corresponding mechanical action, as is normally encountered in a washing machine, is over after at most 2 to 5 minutes.

Support particles consisting of spray-dried sodium sulfate (so-called light sulfate) have proved to be particularly suitable. Core structure and abrasion resistance can be further improved by the co-use of sodium silicate (soda waterglass) in quantities of up to 10% and preferably in quantities of up to 4%. In addition, this support material affords the advantage that the formulation of the detergent, particularly in regard to pH and phosphate content, is not affected.

The paraffin waxes present in the foam inhibitor mixture (II) are generally complex mixtures without a clearly defined melting or solidification point. Their melting range is determined by differential thermal analysis (cf. the journal "The Analyst" 87 (1962), pages 420–434).

Soft and hard paraffins and mixtures thereof, which show no pronounced crystallization behavior and which generally have a softening and melting point in the range of 10° to 60° C. and preferably 20° to 55° C., are suitable as component (a). Paraffins and paraffin mixtures such as these are commercially available, for example, under the names petrolatum, Vaseline and hard or cake paraffins. In choosing the paraffin fractions or rather the mixtures of individual paraffin fractions, it is important to ensure that both solid and liquid material is present in the indicated temperature ranges determined by DTA. This is achieved, for example, by selecting suitable paraffin fractions or by mixing corresponding proportions of semisolid soft paraffins and hard paraffins. Suitable mixtures contain, for example, 1 to 3 parts by weight soft paraffin (Vaseline) having a melting and softening range of 25° to 42° C. and preferably 30° to 40° C., and 3 to 1 parts by weight hard paraffin (cake paraffin) having a softening and melting range of 40° to 60° C. and preferably 42° to 55° C.

The proportion of component (a) in the foam inhibitor mixture (II) is generally from 5 to 60% by weight, and preferably from 20 to 50% by weight.

Microcrystalline paraffin waxes having a melting range of 55° to 90° C. and preferably 60° to 80° C. are suitable as component (b). Microcrystalline waxes such as these include, for example, a constituent of montan waxes or high-melting petroleum fractions (ceresin) and are distinguished by a content of branched and cyclic paraffins. Their proportion in the foam inhibitor mixture is generally between 20 and 90% by weight and preferably between 25 and 60% by weight.

The type and quantity of components (a) and (b) should be selected within the limits of the indicated parameters in such a way that the proportions of solid and liquid constituents in the wax mixture, as determined by differential thermal analysts (DTA), preferably show the following distribution as a function of temperature:

| °C. | Liquid | Solid |
| --- | --- | --- |
| 0° | 0–2% | 100–98% |
| 25° | 2–15% | 98–85% |
| 50% | 30–70% | 70–30% |
| 75% | 95–99% | 1–5% |
| 80° | 100% | 0 |

The above distribution takes into account the fact that paraffin mixtures which appear solid or do not flow at room temperature also contain certain proportions of liquid paraffins.

Component (c) consists of bisamides derived from saturated $C_{12}$–$C_{22}$ and preferably $C_{14}$–$C_{18}$ fatty acids and from $C_2$–$C_7$ alkylenediamines. Suitable fatty acids include lauric acid, stearic acid, arachic acid and behenic acid and also mixtures thereof such as occur in natural fats or hardened fatty oils, such as tallow or hydrogenated palm oil. Suitable diamines include, for example, ethylenediamine, 1,3-propylenediamine, tetramethylenediamine, pentamethylenediamine, hexamethylenediamine, p-phenylenediamine and tolylenediamine. Preferred diamines are ethylenediamine and hexamethylenediamine. Particulary preferred bisamides are bismyristoyl ethylenediamine, bispalmitoyl ethylenediamine, bisstearoyl ethylenediamine and mixtures thereof and also the corresponding derivatives of hexamethylenediamine.

The bisamides which are insoluble in the paraffin mixture must be present in finely divided form and have a particle size of less than 50 μm, at least 90% of the particles having a particle size less than 30 μm. The maximum particle size of the particles is preferably less then 20 μm, at least 50% and more especially at least 95% of the particles being smaller than 10 μm. These particle size data were obtained by the known "Coulter Counter" method.

The foam inhibitor mixture (II) may be prepared by introducing the finely divided bisamide (component c) into a melt of components (a) and (b) and homogenizing it therein by intensive mixing. To this end, the melt should have a temperature of at least 90° C. and at most 200° C. The temperature is preferably between 100° C. and 150° C. The presence of a stable dispersion of the bisamide particles in the paraffin matrix, which is produced by a particle size corresponding to the definition according to the invention, is crucial to the effectiveness of the foam inhibitor. To obtain such a dispersion, it is possible to use and disperse a bisamide which has the corresponding particle size from the outset or a coarser starting material is used and the melt is subjected to grinding in colloid mills, gear mills or ball mills until the required particle size is obtained. This represents a preferred procedure.

Complete melting of the bisamides in the paraffin melt and subsequent rapid cooling to a temperature below the solidification point of the bisamides with simultaneous homogenization of the melt can also lead to a correspondingly fine particle size distribution of the bisamides. A factor which has to be taken into consideration in the choice of the melting temperature is that the melting range of technical grade bis-stearoyl ethylenediamine in the paraffin melt, as determined by DTA, is in the range from 123° to 137° C. while that of bis-stearoyl hexamethylenediamine is in the range from 132° to 141° C. The temperature ranges for the corresponding bis-myristoylamides are 119° to 135° C. and 130° to 138° C., respectively. Below the solidification range, the bisamides are substantially insoluble in the paraffin melt.

It has surprisingly been found that mixtures showing particularly good foam-inhibiting effect are obtained where the starting materials used for the production of the bisamides, i.e. the diamines and fatty acids or their functional derivatives, rather than the bisamides themselves are dispersed in the paraffin melt and reacted to the bisamides by suitable conduct of the reaction. Suitable functional derivatives thereof include, for example, the anhydrides, chlorides, bromides or esters, for example the methyl esters. The molar ratio of diamine to fatty acid may be between 1:1.5 and 1:2.2, and preferably between 1:1.8 and 1:2. An excess of one of the reactants may remain in the mixture without any disadvantages.

The amidation reaction may be accelerated by addition of a suitable catalyst. Where free fatty acids are used, it is preferred to use an acidic catalyst, such as p-tolunesulfonic acid or hydroxybenzenesulfonic acid. The catalyst is preferably used in a quantity of 2 to 12 mol-% per mol of bisamide to be produced. It has surprisingly been found that the foam-inhibiting effect of the end product increases tendentially with increasing quantity of catalyst. This may possibly be attributable to the formation of secondary products with inclusion of the catalyst which remain in the foam inhibitor mixture. The catalyst is best used in a quantity of 3 to 10 mol-% per mol of bisamide.

The reaction takes place at elevated temperatures, for example at 100° to 150° C., and is accompanied by thorough mixing of the reaction mixture and by removal of the water of reaction formed or other volatile reaction products, such as methanol where fatty acid methyl esters are used, by distillation. Removal of the volatile constituents can be promoted by the introduction of an inert gas, such as nitrogen. The temperature is best increased as the reaction progresses. Residues of volatile constituents may be removed by reduced pressure. The resulting mixture of bisamides and paraffins, which contains the bisamides in particularly fine distribution, may be directly further processed.

The molten foam inhibitor mixture (II) may be applied to the particulate support material (1) by methods known per se, for example by gradual mixing, particularly in the form of a spray. The support material is kept in vigorous motion by mixing elements or by fluidization to guarantee uniform charging of the support particles. The spray mixers used for this purpose may be operated continuously or noncontinuously. The melt to be sprayed preferably has a temperature of 80° to 160° C. and more preferably in the range from 100° to 120° C. Preheating of the support material to between 80° and 120° C., and preferably to between 90° and 110° C., can be of advantage for obtaining a uniformly impregnated, agglomerate-free material. After the particles have been impregnated, the treated material is cooled, for example with flowing air in a fluidized bed, and may then immediately be subsequently processed, for example added to and mixed with a granular detergent or cleaning preparation.

The foam regulator may also be prepared by dissolving the support salt (I) in water and dispersing the foam inhibitor mixture (II) therein and subsequently spray-drying the resulting slurry. To stabilize the dispersion, it is preferred to add a water-soluble, non-surfactant dispersion stabilizer in the form of a swellable polymer. Examples of such polymers include cellulose ethers, such as carboxymethyl cellulose, methyl cellulose, homopolymers and copolymers of unsaturated carboxylic acids, such as acrylic acid, maleic acid, and copolymerizable vinyl compounds, such as vinyl ether, acrylamide and ethylene. The addition of polymeric dispersion stabilizer preferably comprises 1 to 5% by weight, based on the foam regulator. The water content of the slurry may vary from 30 to 60% by weight, depending on the type and solubility of the support salt. The dispersion may be spray-dried in known manner in spray-drying towers using hot drying gases flowing in co-current or countercurrent.

A content of 2 to 30% by weight and preferably 5 to 20% by weight of foam inhibitor mixture, based on the end product, is adjusted according to the porosity of the support material.

The quantity in which the granular foam regulator is used depends upon the content of active foam inhibitor mixture (II) and upon the type and foaming activity of the surfactants present in the detergent and cleaning preparations. For domestic detergents of standard composition, i.e. those containing between 3 and 10% by weight of foam-active sulfonate or sulfate surfactants and, optionally, nonionic surfactants, an addition of less than 1%, based on foam inhibitor mixture (II), is generally sufficient. In many cases, an addition of 0.1 to 0.3% is sufficient.

Accordingly, the quantities used are clearly less than those prepared and used in accordance with the teaching of European Patent 0 087 233 and are thus of the same order as highly effective silicone foam inhibitors which, however, are much more expensive and are attended by various disadvantages, including variable effectiveness in the event of prolonged storage and the property of hydrophobicizing the surface of the treated fabrics. By contrast, the foam regulators according to the invention retain their effectiveness and show no hydrophobicizing effects, even after prolonged storage in admixture with detergents and cleaning preparations.

EXAMPLE 1

10% Vaseline (petrolatum A),
34% hard paraffin (Terhell ® 4444),
44% microcrystalline wax (Witcodur ® 272), and
12% N,N'-bis-myristoyl ethylenediamine were melted by heating under nitrogen to 150° C. By cooling the melt to 110° C. with intensive mixing by means of a turbo-stirrer, the bisamide crystallizing out obtains a particle size of no more than 10 μm. 10 Parts by weight of the liquid mixture were sprayed with intensive mechanical mixing onto 90 parts by weight of a spray-dried sodium sulfate preheated to 110° C. (weight per liter 450 g, particle size 0.2 to 0.6 mm).

The mixture consisting of Vaseline, hard paraffin and microwax showed the following melting behavior (DTA):

| °C. | % Liquid | % Solid |
|---|---|---|
| −20 | 0 | 100 |
| 0 | 1 | 99 |
| 25 | 18 | 82 |
| 50 | 62 | 38 |
| 75 | 97.3 | 2.7 |
| 85 | 100 | 0 |

EXAMPLE 2

A 1:1 mixture of paraffin and microcrystalline wax showed the following melting behavior (DTA):

| °C. | % Liquid | % Solid |
|---|---|---|
| −20 | 0 | 100 |
| 0 | 0.5 | 99.5 |
| 25 | 12.5 | 87.5 |
| 50 | 55.2 | 44.8 |
| 75 | 95.3 | 4.7 |
| 85 | 100 | 0 |

88% by weight of the molten mixture was ground and homogenized in a colloid mill at 80° C. in the presence of 12% bisstearoyl ethylene diamine until 95% of the bisamide had a particle size of less than 10 μm and no more than 5% had a particle size of less than 20 μm. 6% by weight of the mixture was dispersed in an aqueous slurry containing 58% by weight of sodium sulfate and 2% by weight of Na carboxymethyl cellulose. This mixture was sprayed through nozzles into a spray-drying tower and spray-dried by means of combustion gases flowing countercurrently. The spray-dried product freed from fine and coarse particles had a particle size of 0.3 to 0.8 mm and a weight per liter of 450 g.

EXAMPLE 3

120 g of stearic acid (0.42 mol), 13.9 g of ethylenediamine (0.23 mol, corresponding to a 10% excess) and 3.5 g of p-toluenesulfonic acid (0.021 mol, corresponding to 5 mol-%, based on bisamide) were dispersed in 880 g of a paraffin melt heated to 100° C. in accordance with Example 1. The temperature was increased over a period of 1 hour under nitrogen to 150° C. with continuous mixing and removal of the water of reaction. After heating in vacuo (first 100 mbar, then 1 mbar) for another hour at 150° C., the mixture was rapidly cooled to 120° C. and sprayed onto spray-dried sodium sulfate in accordance with Example 1, so that the end product contains 10% by weight of the foam inhibitor mixture.

The foam inhibitor mixture itself contained approximately 11.5% bisamide and 0.6% unidentified reaction products of stearic acid, diamine and toluenesulfonic acid.

The foam regulator was tested in a commercial washing machine with a horizontally mounted drum charged with 3 kg of clean cotton fabrics. The front window of the machine was divided into four equal sections above the liquid level. The foam marks shown below have the following meanings:

0 = no foam
1 = foam height ¼
2 = foam height ½
3 = foam height ¾
4 = foam height 4/4
5 = overfoaming The composition of the detergent used is shown in Table 1. The abbreviation EO stands for mol of added ethylene oxide and the abbreviation TPP for tripolyphosphate. The "salts" consist of Na perborate, Na silicate and Na sulfate including the sodium sulfate in the support material.

All the foam inhibitor samples showed a neutral reaction in 1% aqueous solution.

TABLE 1

|  | % by weight |
|---|---|
| Na dodecylbenzenesulfonate | 8.5 |
| Ethoxylated tallow alcohol 5 EO | 3.0 |
| Ethoxylated tallow alcohol 10 EO | 1.5 |
| Soap (tallow/coconut oil) | 1.5 |
| Na carboxymethyl cellulose | 1.0 |
| Na TPP | 18.0 |
| Zeolite NaA | 20.0 |
| Sequestering agent | 0.5 |
| Salts, water, foam inhibitor | balance |

The detergent concentration was 10 g/l. Tapwater having a hardness of 16° Gh (160 mg CaO/l) was used. The machine was switched on (so-called normal program, no prewash) and the foam height read off as a function of the temperature. The results are shown in Table 2 below. The "% by weight foam inhibitor" is based on the quantity of active substance used, i.e. support salts were not included.

COMPARISON TESTS (A) The procedure was as in Example 1, except that the foam inhibitor was sprayed onto the spray-dried detergent in amounts of 0.2 and 0.5%. A second series of comparison samples and samples of detergents 4 and 5 were stored for 6 weeks at 30° C.

(B) The procedure was as in Example 1, except that the bisamide was only dispersed in the paraffin melt and not ground. The particle size of the bisamide was in the range from 20 to 60 μm with a maximum size of 30 to 40 μm.

(C) A foam inhibitor was prepared in accordance with comparison test (B), except that the microwax-paraffin mixture was replaced by the same quantity of Vaseline (petrolatum) and the bisamide was not ground.

The results show that, even when used in small quantities of 0.1 to 0.2%, based on foam inhibitor mixture, the foam regulators according to the invention show balanced foam behavior. The comparison samples are only effective in very much higher concentrations and lose some of their effectiveness in storage. A coarse distribution of the bisamides also reduces the foam-inhibiting effect.

TABLE 2

| Foam inhibitor of Example no. | | % | Foam marks at °C. | | | |
|---|---|---|---|---|---|---|
|  |  |  | 30° | 50° | 70° | 90° |
| 1 | 1 | 0.1 | 2 | 2 | 2 | 2.5 |
| 2 |  | 0.2 | 1.5 | 1 | 1 | 2 |
| 3 |  | 0.5 | 0 | 0 | 0 | 1 |
| 4 | 2 | 0.1 | 2.5 | 2 | 2 | 2 |
| 5 |  | 0.2 | 1.5 | 1 | 1 | 1 |
| 6 |  | 0.5 | 0 | 0 | 0 | 0.5 |
| 7 | 3 | 0.1 | 1 | 0.5 | 0.5 | 1 |
| 8 |  | 0.2 | 0 | 0 | 0 | 0.5 |
| 9 | (A) | 0.1 | 5 | 5 | 5 | 5** |
| 10 |  | 0.2 | 4 | 4 | 4 | 5** |

TABLE 2-continued

| Foam inhibitor of Example no. | | % | Foam marks at °C. | | | |
|---|---|---|---|---|---|---|
| | | | 30° | 50° | 70° | 90° |
| 11 | | 0.5 | 2 | 3 | 3 | 4 |
| 12 | 1 stored | 0.2 | 1 | 1 | 1 | 2 |
| 13 | | 0.5 | 0 | 0 | 0 | 1 |
| 14 | (A) stored | 0.2 | 5 | 5 | 5 | 5** |
| 15 | | 0.5 | 4 | 4 | 4 | 5** |
| 16 | (B) | 0.5 | 4 | 3 | 4 | 5* |
| 17 | (C) | 0.5 | 5 | 5 | 5 | 5* |

*Losses of wash liquor up to 100 g
**Considerable losses of wash liquor beyond 100 g

We claim:

1. A free-flowing, granular foam regulator composition suitable for use over a broad temperature range in detergent and cleaning preparations, consisting of
   (I) a water-soluble, granular, spray-dried, surfactant-free support material having a porous structure and an apparent density of from about 200 to about 700 g./l., and
   (II) adsorbed on said support material, from about 2 to about 30%/wt of a foam inhibitor mixture which is free from siloxane polymers and emulsifying or dispersing surfactants and which consists essentially of a homogenized mixture of the following constituents:
      (a) about 5 to about 60% by weight of a paraffin wax or paraffin wax mixture,
      (b) about 20 to about 90% by weight of a microcrystalline paraffin wax, wherein the proportion of liquid constituents in the mixture of (a) and (b), as determined by differential thermal analysis, amounts to 0% at −15° C., between 0 and about 5% at 0° C., between 2 and about 25% at about 25° C., between about 20 and about 80% at 50° C., between about 80 and about 100% at 75° C., and 100% above 90° C., and
      (c) about 5 to about 20% by weight of a diamide derived from $C_2$–$C_7$ diamines and saturated $C_{12}$–$C_{22}$ fatty acids which is present in finely divided form and has a particle size of less than about 20 μm, at least about 50% of the particles being smaller than about 10 μm.

2. A foam regulator composition as in claim 1, wherein said support material consists of spray-dried sodium sulfate having a particle size of from about 0.1 to about 1.6 μm.

3. A foam regulator composition as in claim 1, wherein said support material is selected from the group consisting of sodium sulfate, sodium bicarbonate, sodium borate, sodium hydrogen phosphate, sodium hydrogen pyrophosphate, the potassium salts thereof, and mixtures thereof.

4. A foam regulator composition as in claim 1, wherein said support material is an organic salt selected from the group consisting of an acetate, tartrate, succinate, and the salts of aminopolycarboxylic acid.

5. A foam regulator composition as in claim 1, wherein said paraffin wax or paraffin wax mixture have a softening and melting point in the range of about 10° C. to about 60° C.

6. A foam regulator composition as in claim 1, wherein said microcrystalline paraffin wax has a melting range of about 55° C. to about 90° C.

7. A foam regulator composition as in claim 1, wherein the proportion of liquid constituents in said mixture of (a) and (b) amounts to 0 to about 2% at 0° C., about 2 to about 15% at 25° C., about 30 to about 70% at 50° C., about 95 to about 99% at 75° C., and about 100% at 80° C.

8. A foam regulator composition as in claim 1 wherein said diamide consists of a bisamide of ethylenediamine and a saturated $C_{14}$–$C_{18}$ fatty acid.

9. The process of regulating the foam over a broad temperature range generated from a detergent or cleaning preparation comprising applying thereto an amount of granular foam regulator composition effective to regulate said foam, said composition consisting of:
   (I) a water-soluble, granular, spray-dried, surfactant-free support material having a porous structure and an apparent density of from about 200 to about 700 g./l., and
   (II) adsorbed on said support material, from about 2 to about 30%/wt of a foam inhibitor mixture which is free from siloxane polymers and emulsifying or dispersing surfactants and which consists essentially of a homogenized mixture of the following constituents:
      (a) about 5 to about 60% by weight of a paraffin wax or paraffin wax mixture,
      (b) about 20 to about 90% by weight of a microcrystalline paraffin wax, wherein the proportion of liquid constituents in the mixture of (a) and (b), as determined by differential thermal analysis, amounts to 0% at −15° C., between 0 and about 5% at 0° C., between about 2 and about 25% at 25° C., between about 20 and about 80% at 50° C. and 100% at 75° C. and 100% above 90° C., and
      (c) about 5 to about 20% by weight of a diamide derived from $C_2$–$C_7$ diamines and saturated $C_{12}$–$C_{22}$ fatty acids which is present in finely divided form and has a particle size of less than about 20 μm, at least about 50% of the particles being smaller than about 10 μm.

10. The process as in claim 9, wherein said support material consists of spray-dried sodium sulfate having a particle size of from about 0.1 to about 1.6 μm.

11. The process as in claim 9, wherein said paraffin wax or paraffin wax mixture have a softening and melting point in the range of about 10° C. to about 60° C., and said microcrystalline paraffin wax has a melting range of about 55° C. to about 90° C.

* * * * *